Feb. 13, 1945.  A. GRAUSE  2,369,455
CONNECTING DEVICE FOR AIRCRAFT CATAPULTS
Filed June 24, 1941
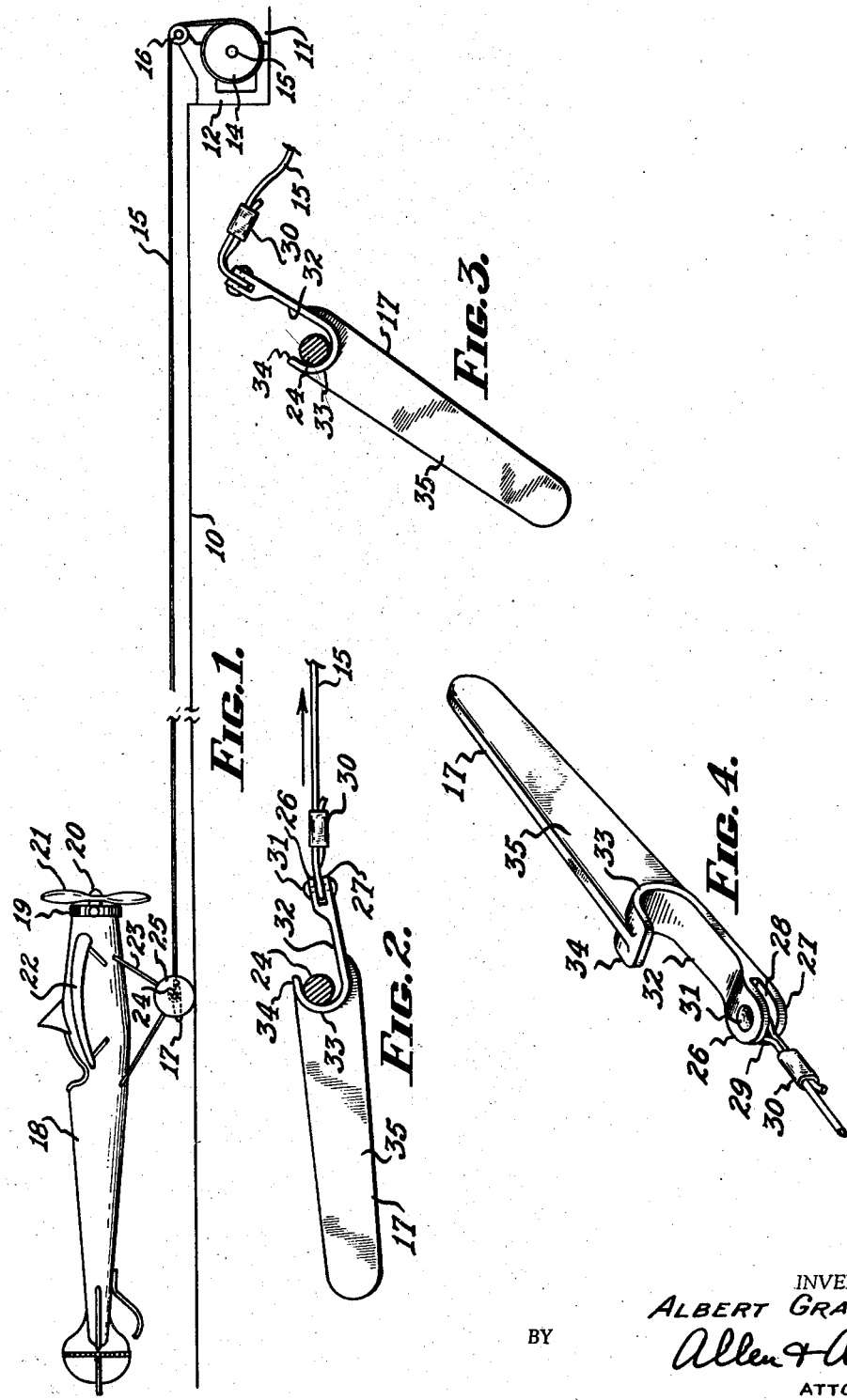
INVENTOR.
ALBERT GRAUSE.
BY Allen & Allen
ATTORNEYS.

Patented Feb. 13, 1945

2,369,455

UNITED STATES PATENT OFFICE 2,369,455

CONNECTING DEVICE FOR AIRCRAFT CATAPULTS

Albert Grause, Covington, Ky.

Application June 24, 1941, Serial No. 399,484

1 Claim. (Cl. 244—63)

This invention relates to improvements in connecting devices for catapulting mechanism for attachment to aeroplanes, hydroplanes and similar aircraft, and particularly to an automatically releasing connecting device.

An object of the invention is the provision of an improved connecting hook for catapulting mechanism for use on aeroplane runways and the like to assist in the take off of aeroplanes, particularly the larger type of bombers and heavily loaded planes, which do not acquire sufficient elevation in the limited length of the runway.

Another object of this invention is the provision of an automatic releasing hook for the catapulting mechanism wherein cable connection to the aircraft will be automatically disengaged at the proper instant and without supervision by an attendant.

It is also an object of this invention to provide a connecting member for the catapulting mechanism which will readily disengage from the aircraft when the catapulting force is overcome by the forward movement of the plane.

Other objects and advantages of the present invention should be readily apparent by reference to the following specification considered in conjunction with the accompanying drawing forming a part thereof and it should be understood that modifications may be made in the exact structural details there shown and described, within the scope of the appended claim, without departing from or exceeding the spirit of the invention.

Figure 1 is a more or less diagrammatic view showing the invention in actual operation.

Fig. 2 is an enlarged side elevational view of the improved connecting member between the catapulting mechanism and aircraft with said member in the position it would occupy when in use.

Fig. 3 is a view similar to Fig. 2 illustrating, however, the connecting member in the position it occupies when the pulling tension thereon is overcome by the forward movement of the plane.

Fig. 4 is a perspective view of the connecting member illustrating in detail a preferred form of construction.

Throughout the several views of the drawing similar reference characters are employed to denote the same or similar parts.

There is illustrated in Fig. 1, and indicated by the reference numeral 10, a runway which may be a cement runway on the ground or the deck of a ship depending upon the type of aircraft being launched, that is, whether it is a land plane, hydroplane or some other specific type of aircraft. At one end of the runway there is a pit or offset 11 in which is mounted an engine 12 of any suitable or desirable construction and type which has means for driving a shaft 13 and drum 14. Encircled around the drum 14 is the cable 15 which also passes over guide or idler pulley or wheel 16. It will be understood that the idler pulley or wheel 16 is arranged to properly position the cable 15 when in the actual pulling operation. The inner end of the cable 15 has attached thereto the connecting member indicated in general by the reference numeral 17 and it is to the construction of this connecting member that my invention is particularly directed.

The aircraft to be launched will have the usual parts, that is, a body or fuselage 18 terminating its forward end in a nose on which is mounted, in the usual manner, the self contained motor 19. The motor 19 has associated therewith and driven thereby the propeller shaft 20 on which is mounted the propeller 21. Behind the motor 19 and propeller 21, the fuselage has laterally projecting therefrom the wings 22. In the particular form of aircraft illustrated in the drawing the fuselage has depending therefrom a carriage 23 comprising an axle 24 having rotatably mounted thereon the wheels 25 which support the plane on the runway 10. As illustrated in the drawing use is made of the axle 24 to attach the connecting member 17 thereto, but any other form of cross bar will serve equally as well.

The connecting member 17 as illustrated most clearly in Figs. 2, 3 and 4 is formed of unitary construction with its front end bifurcated to provide spaced fingers 26 and 27 with a space 28 therebetween. Disposed in the spaces 28 is the free end of the cable 15 looped so as to provide an eye 29, and with the loop of the cable suitably fastened by a clamp 30. A rod or bolt, as illustrated at 31, passes through the fingers 26 and 27 and the eye 29 to connect the member 17 to the cable. The axes of the rod 31 in the illustration is horizontal but for many installations it may be vertical. This, as will be obvious, can be accomplished by extending the fingers or arms 26, 27 in a vertical rather than a horizontal plane.

From the bifurcated connecting portions 26 and 27, the connecting member, a flat surfaced arm 32, extends. The arm has integrally formed therewith an upwardly disposed or faced hook 33, in the form of a semi-circle. The hook 33 has a short end 34. Projecting rearwardly, and substantially medially of the hook 33 is a tail or arm 35 which is of considerable length and of substantial weight. It will be noted by reference particularly to Figs. 2 and 3 of the drawing, that the distance from the end 33 of the open hook to the ends of the arms 26 and 27 is quite short compared to the distance from the portion 33 to the end of the tail or arm 35. Considering the jaw 33 as a fulcrum, or pivot point, the member 17, due to the weight of the tail or vane 35, would oscillate in a counterclockwise direction about the axle 24 from the position shown in Fig. 2, to the position shown in Fig. 3, as soon as the cable tension is overcome by the forward movement of the plane, and thereby automatically disengage from the axle 24.

The operation of this mechanism is as follows:

The motor 19 of the aircraft is started to rotate the propeller 21. As the motor is warmed up and the rate of rotation of the propeller increased, substantially to its take-off speed, the auxiliary engine or motor 12 is started and the cable 15 begins to wind up pulling the plane forward. The movement of the plane as effected by the engine or motor 12 is accelerated by tension of the cable 15. The lifting force of the propeller 21 against the wings 22, causes the aircraft to "take off" sooner than it would due to the rotation of the propeller 21 alone. As soon as the movement of the aircraft, due to its own forward propelling power, exceeds the pulling movement of the cable 15 the tension on the cable becomes slack, whereupon the connecting member 17 rotates counterclockwise about 90 degrees and automatically falls from the pulling position, shown in Fig. 2, to its releasing position shown in Fig. 3, and drops by gravity from the axle 24 of the plane.

This device is particularly useful when launching a heavily loaded machine such as a military bomber, freight plane or even a transport loaded to capacity for long distance flights. It will be appreciated, of course, that the mechanism of this invention may be employed at air ports when the take off field or runway is relatively short even for normal take off and it thereby insures the safe launching of the aircraft on such a field.

The connecting member 17 is illustrated in the drawing and has been described as connected with the axle 24 of the aircraft but it will be understood that a separate attaching bar or the like may be supplied on the aircraft for connection with the member 17.

From the foregoing, the operation of this structure will be readily understood. I have provided a connecting member for a catapulting mechanism which will automatically disengage itself from the aircraft when the speed of the plane exceds the speed of movement of the cable. Instead of having the catapulting mechanism arranged on a fixed runway, as illustrated, it may be arranged on a turntable so that regardless of the direction of the wind the plane can be assisted in its take-off into the wind.

Having thus described my invention, what I claim as new and desire to secure by Letters Patent, is:

In an aircraft catapult connecting device for use in combination with a pulling cable of said catapult and adapted to engage a cross bar on the aircraft comprising a semi-circular hook portion, the end of said hook portion facing upwardly, and weighted means formed on said hook and tending to oscillate said hooked portion to disengaging position when tension on said cable becomes slack, said weighted means shaped as a vane extending counter to the direction of movement of said pulling cable.

ALBERT GRAUSE.